United States Patent
Baino et al.

(10) Patent No.: US 7,051,533 B2
(45) Date of Patent: May 30, 2006

(54) METHOD AND SYSTEM FOR CONTROLLING GAS TURBINE ENGINE

(75) Inventors: Makoto Baino, Kobe (JP); Yukinobu Kouno, Inami-cho (JP); Keisuke Sasae, Kakogawa (JP); Hideo Kimura, Kobe (JP); Yasuhiro Kinoshita, Kobe (JP); Masayoshi Kobayashi, Kobe (JP); Takanobu Yoshimura, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 199 days.

(21) Appl. No.: 10/495,869

(22) PCT Filed: Oct. 16, 2003

(86) PCT No.: PCT/JP03/13242

§ 371 (c)(1),
(2), (4) Date: May 18, 2004

(87) PCT Pub. No.: WO2004/038199

PCT Pub. Date: May 6, 2004

(65) Prior Publication Data

US 2004/0255594 A1    Dec. 23, 2004

(30) Foreign Application Priority Data

Oct. 22, 2002 (JP) .............................. 2002-306452

(51) Int. Cl.
*F02C 9/26* (2006.01)

(52) U.S. Cl. ...................................... 60/773; 60/39.281

(58) Field of Classification Search ............. 60/39.281, 60/734, 746, 747, 773
See application file for complete search history.

(56) References Cited

U.S. PATENT DOCUMENTS

| | | | |
|---|---|---|---|
| 4,716,719 A | | 1/1988 | Takahashi et al. |
| 5,024,055 A | * | 6/1991 | Sato et al. ............... 60/39.281 |
| 5,054,280 A | * | 10/1991 | Ishibashi et al. .............. 60/776 |
| 5,806,299 A | | 9/1998 | Bauermeister et al. |
| 6,092,362 A | | 7/2000 | Nagafuchi et al. |
| 6,282,885 B1 | | 9/2001 | Muramatsu et al. |

FOREIGN PATENT DOCUMENTS

| | | |
|---|---|---|
| JP | A 61-241425 | 10/1986 |
| JP | A 62-206237 | 9/1987 |
| JP | A 63-61725 | 3/1988 |
| JP | A 63-134825 | 6/1988 |
| JP | A 7-4265 | 1/1995 |
| JP | A 10-212976 | 8/1998 |
| JP | A 2000-248964 | 9/2000 |
| JP | A 2002-257345 | 9/2002 |

* cited by examiner

*Primary Examiner*—Louis J. Casaregola
(74) *Attorney, Agent, or Firm*—Oliff & Berridge, PLC

(57) ABSTRACT

In a control method of a gas turbine engine, an engine controller 4 outputs a combustor power command FD based on an engine condition from an engine condition detector 3. Then, a combustion controller 6 determines each fuel flow rate based on the combustion power command FD. The combustor controller 6 overrides each fuel flow rate for a certain period, to realize smooth stage-process.

9 Claims, 3 Drawing Sheets

METHOD AND SYSTEM FOR CONTROLLING GAS TURBINE ENGINE

BACKGROUND OF THE INVENTION

1. Field of the Invention

The present invention relates to a control method of a gas turbine engine and a control system of the same. More particularly, it pertains to control method and system that are applicable to a control of a gas turbine engine including a multistage combustor.

2. Background Art

In a conventionally known control method of a gas turbine engine, a multistage combustor is formed by dividing the combustor into a pilot combustion chamber (diffusion combustion chamber) and a main combustion chamber (premix combustion chamber). By switching combustions thereof during an operation, an equivalence balance is suitably maintained to restrain a discharge of NOx (nitrogen oxides).

In such a control method of an engine, a sum of the fuel flow rate to be supplied to the pilot combustion chamber and the main combustion chamber is adjusted by means of a fuel adjusting valve located near a source, while a fuel supply is switched from the pilot combustion chamber to the main combustion chamber by means of a switching valve located downstream of the fuel adjusting valve. (See, for example, Japanese Patent Laid-Open Publication No. 206237/1987. See Japanese Patent Laid-Open Publications Nos. 61725/1988, 134825/1987, and 4265/1995 for other control methods of a gas turbine engine including a pilot combustion chamber and a main combustion chamber).

However, there is a disadvantage in such a conventional fuel switching manner. That is, a rotational speed of a turbine may decrease upon switching, because of a delayed filling of a pipe with fuel or an ignition delay, for example. Then, an abrupt ignition of a main burner may destabilize an engine so that a surge, for example, is generated.

SUMMARY OF THE INVENTION

The present invention is made in view of the disadvantages of the conventional art. It is an object of the present invention to provide a control method of a gas turbine engine including a multistage combustor and a control system of the same, in which a switching control of combustions of the gas turbine engine can be smoothly conducted.

A control method of a gas turbine engine including a combustor having a plurality of main combustion portions and a plurality of pilot combustion portions, an engine condition detector, and a combustor condition detector, comprises the steps of: outputting a combustor power command based on an engine condition from the engine condition detector; and carrying out a stage-processing by outputting a fuel flow rate command, the fuel flow rate of the command being obtained by overriding, for a predetermined period, a step flow rate determined based on a combustor condition from the combustor condition detector to a fuel flow rate determined based on the combustor power command.

In the control method of a gas turbine engine, the main combustion portions are divided into the predetermined number of blocks, and when the fuel flow rate command is output, the fuel flow rate command is respectively output to the main combustion portions of the combustor for every block.

In the control method of a gas turbine engine, immediately after an ignition of the main combustion portions is detected, the fuel flow rate of the command has a value obtained by subtracting the step flow rate from a fuel flow rate at the detection of the ignition.

In the control method of a gas turbine engine, the ignition of the main combustion portions is detected based on a pressure variation of the combustor, a temperature of a combustion gas, a brightness of a combustion gas, a wavelength of a combustion gas, a rotational speed of a turbine, or a controlled variable of the engine.

A controlling system of a gas turbine engine including a combustor having a plurality of main combustion portions and a plurality of pilot combustion portions, comprises: an engine condition detector; a combustor condition detector; an engine controller for outputting a combustor power command based on an engine condition from the engine condition detector; and a combustor controller for carrying out a stage-processing by outputting a fuel flow rate command to the each combustor portions, the fuel flow rate of the command being obtained by overriding, for a predetermined period, a step flow rate determined based on a combustor condition from the combustor condition detector to a fuel flow rate determined based on the combustor power command.

In the controlling system of a gas turbine engine, the combustor controller outputs the fuel flow rate command respectively to the main combustion portions divided into blocks.

In the controlling system of a gas turbine engine, immediately after an ignition of the main combustion portions is detected, the fuel flow rate of the command has a value obtained by subtracting a step flow rate from a fuel flow rate at the detection of the ignition.

In the controlling system of a gas turbine engine, the ignition of the main combustion portions is detected based on a pressure variation of the combustor, a temperature of a combustion gas, a brightness of a combustion gas, a wavelength of a combustion gas, a rotational speed of a turbine, or a controlled variable of the engine.

A gas turbine engine comprises: a compressor; a turbine; a combustor including a plurality of main combustion portions and a plurality of pilot combustion portions; and a control system of a gas turbine including an engine condition detector, a combustor condition detector, an engine controller for outputting a combustor power command based on an engine condition from the engine condition detector, and a combustor controller for carrying out a stage-processing by outputting a fuel flow rate command, the fuel flow rate of the command being obtained by overriding, for a predetermined period, a step flow rate determined based on a combustor condition from the combustor condition detector to a fuel flow rate determined based on the combustor power command.

According to the present invention, an output variation of an engine during a stage-processing can be minimally restrained.

DETAILED DESCRIPTION OF THE INVENTION

Although the present invention is hereafter described based on an embodiment with reference to the attached drawings, the present invention is not limited thereto.

Figure 1:
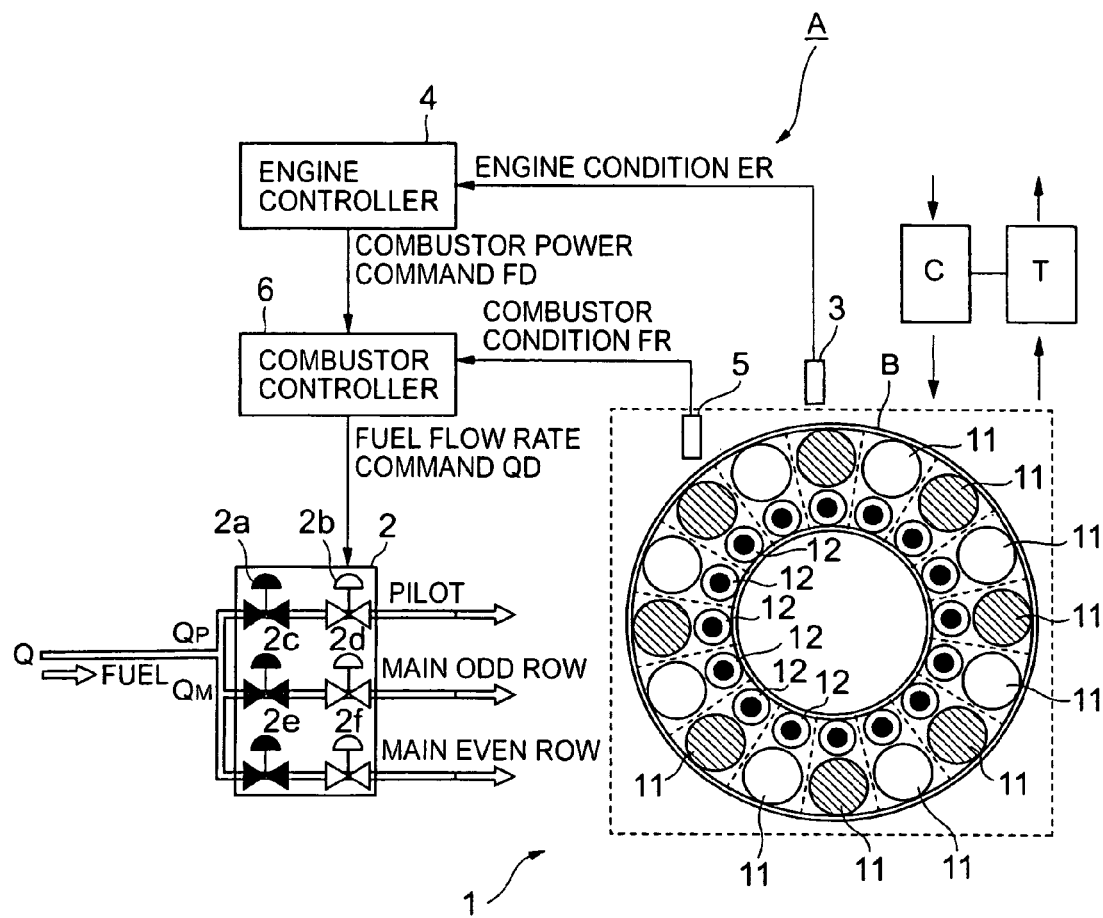
FIG. 1 is a block diagram showing a schematic constitution of a control system to which a control method of a gas turbine engine according to one embodiment of the present invention is applied.

FIG. 1 shows a schematic view of an engine control system to which a control method of a gas turbine engine according to one embodiment of the present invention is applied.

The engine control system (hereinafter referred to simply as "a control system") A controls a gas turbine engine (hereinafter referred to simply as "an engine") 1 which is used as a propellant engine of, for example, an aircraft, and includes a combustor B, a turbine T, and a compressor C. The engine control system A includes the following constituent elements: a fuel flow rate controller 2 for adjusting a fuel flow rate Q to be supplied to the combustor B based on a fuel flow rate command QD which is described below; an engine condition detector 3 having, for example, a rotary position sensor which detects a condition (e.g., a turbine rotational speed) ER of the engine 1 (hereinafter referred to as "an engine condition ER"); an engine controller 4 for monitoring the engine condition ER detected by the engine condition detector 3 and generating a combustor power command FD to control the engine condition ER; a combustor condition detector 5 having, for example, a pressure sensor which detects a condition (e.g., a compressor outlet pressure, a compressor inlet pressure, and a temperature) FR of the combustor B (hereinafter referred to as "a combustor condition FR"); and a combustor controller 6 for generating a fuel flow rate command QD based on a combustor power command FD with referring to the combustor condition FR detected by the combustor condition detector 5, and outputting the fuel flow rate command QD to the fuel flow rate controller 2.

The combustor B of the engine 1 carries out a combustion in a premixed and preevaporated manner, for example. The combustor B is an annular type combustor including a plurality of (e.g., 16) main combustion portions (main burners) 11, 11, ... (hereinafter referred to as "main combustion portions 11") which are annularly disposed outside, and the same number of pilot combustion portions (pilot burners) 12, 12, of diffusion-combustion type (hereinafter referred to as "pilot combustion portions 12") which are disposed inside the main combustion portions 11 to correspond thereto.

The combustion in a premixed and preevaporated manner in this context is carried out as follows: Fuel is previously evaporated in the main combustion portions 11, and air for combustion is supplied to the evaporated combustion vapor. The fuel and the air are previously mixed, and then a combustion is carried out.

In order to reduce a discharge amount of NOx (nitrogen oxides), the combustor B is operated in such a manner that the main combustion portions 11 are operated only when a high load is applied to the engine, i.e., the main combustion portions 11 are not operated when a low load is applied to the engine. On the other hand, the pilot combustion portions 12 are operated only when a low load is applied to the engine. Thus, it is required for the engine 1 to switch operating combustion portions during an operation. Namely, an ignition and an extinguishment of the main combustion portions 11 must be performed. Such a switching of the operating combustion portions (hereinafter referred to as "a stage-processing") is performed under the control of the combustor controller 4. The operating combustion portions herein mean the combustion portions which mainly carry out a combustion of a combustor power.

In order to mitigate an impact generated during a stage-processing as much as possible, the main combustion portions 11 are circumferentially divided alternately into two groups (blocks). (Hereinafter one group is referred to as "an odd row" (shaded circles in the drawing), and the other group is referred to as "an even row" (blank circles in the drawing)). An ignition and an extinguishment of the respective groups can be independently controlled. The main combustion portions 11 may be divided into any number of groups (blocks). For example, an ignition and an extinguishment of each of the main combustion portions 11 may be independently controlled.

The fuel flow rate controller 2 includes a pilot pressure adjusting valve 2a for adjusting a pressure of fuel to be supplied to the pilot combustion portions 12, a pilot fuel flow rate adjusting valve 2b for adjusting a flow rate of fuel to be supplied to the pilot combustion portions 12, an odd row pressure adjusting valve 2c for adjusting a pressure of fuel to be supplied to the odd row of the main combustion portions 11, an odd row fuel flow rate adjusting valve 2d for adjusting flow rate of fuel to be supplied to the odd row of the main combustion portions 11, an even row pressure adjusting valve 2e for adjusting a pressure of fuel to be supplied to the even row of the main combustion portions 11, and an even row fuel flow rate adjusting valve 2e for adjusting flow rate of fuel to be supplied to the even row of the main combustion portions 11. The respective valves 2a to 2e adjust a pressure and a flow rate of fuel to be supplied based on the fuel flow rate command QD.

The engine controller 4 generates a combustor power command FD as a manipulated variable for operating the fuel flow rate Q such that the engine condition ER as a controlled variable is adjusted to comply with a target value. In a general engine, since a combustion efficiency is substantially 100%, the fuel flow rate Q and the combustor power command FD are coincident with each other. To be specific, the fuel flow rate Q is a sum of the fuel flow rate $Q_M$ to be supplied to the main combustion portions 11 (hereinafter referred to as "a main fuel flow rate") and a fuel flow rate $Q_P$ to be supplied to the pilot combustion portions 12 (hereinafter referred to as "a pilot fuel flow rate"). Hereinafter, a control conducted by the engine controller 4 with the engine condition ER as a controlled variable is referred to as "an engine control".

In a general engine operation where no stage-processing is executed, the combustor controller 6 generates the fuel flow rate OD such that the fuel flow rate Q indicated by the combustor power command FD is allocated to the main fuel flow rate $Q_M$ and the pilot fuel flow rate $Q_P$, in accordance with a load condition of the engine 1. In addition, the combustor controller 6 carries out various processes needed for smoothly carrying out a stage-processing.

Figure 2:
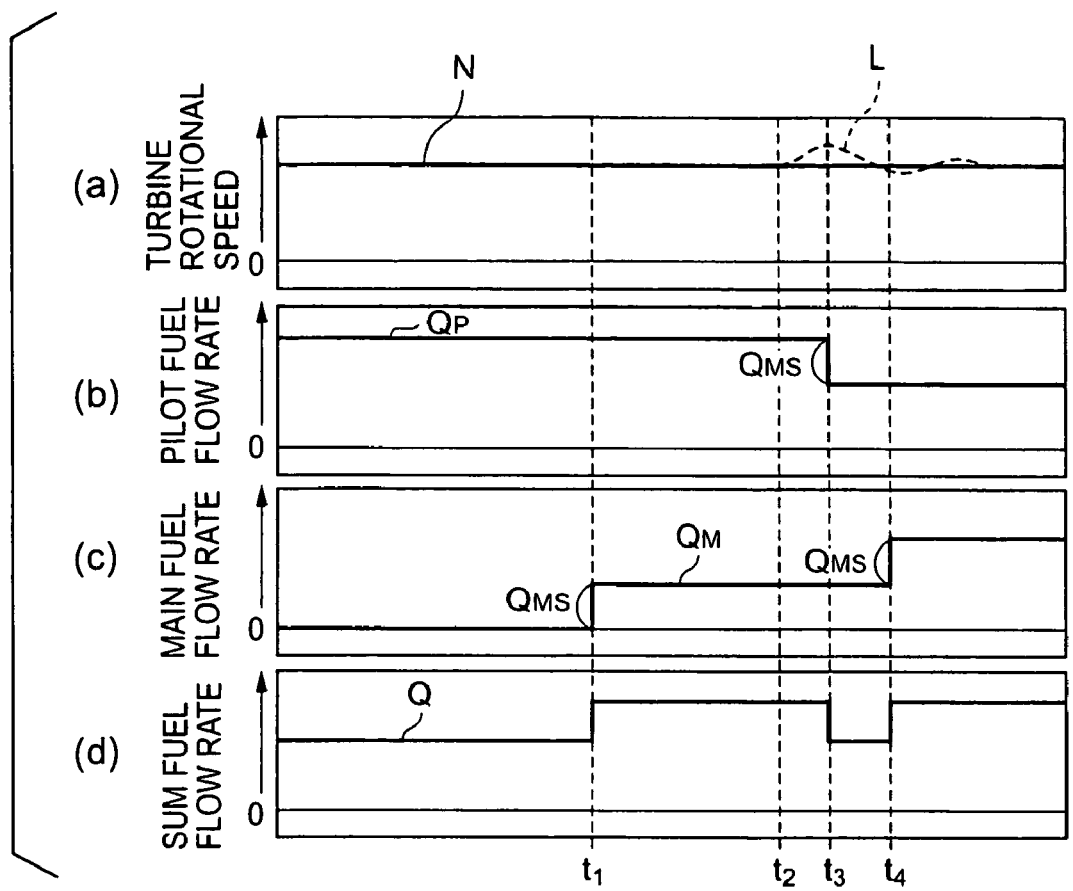
FIG. 2 is a time chart showing changes of a turbine rotational speed, a pilot fuel flow rate, a main fuel flow rate, and a sum fuel flow rate under a combustion switching control by the control method according to the embodiment of the present invention.

The stage-processing is described with reference to FIG. 2. FIG. 2 is a time chart of before and after the stage-processing, which shows changes of the engine condition ER (specifically, a turbine rotational speed N), the pilot fuel flow rate $Q_P$, the main fuel flow rate $Q_M$, and the fuel flow rate Q (hereinafter sometimes referred to as "a sum fuel flow rate") which is a sum of the pilot fuel flow rate $Q_P$ and the main fuel flow rate $Q_M$. In general, the stage-processing is carried out in a steady state in which a rotational speed is constant and an accelerated state. However, with a view to facilitating an understanding, here is described a case in which the operating combustion portions are switched from the pilot combustion portions 12 to the main combustion portions 11 in a steady state.

When carrying out the stage-processing in an accelerated state, the rotational speed and the fuel flow rates are increased by certain amounts as compared with the stage-processing in a steady state as shown in FIG. 2. However, the processes are basically the same.

(1) Until a time $t_1$ which is a starting point of the stage-processing, only the pilot combustion portions 12 are operated, and the main combustion portions 11 are not operated. In this condition, the pilot fuel flow rate $Q_P$ corresponds to a combustor power, and the combustor power command FD operates the pilot fuel flow rate $Q_P$.

(2) At the time $t_1$ when the stage-processing starts, a certain flow rate (hereinafter referred to as "a step flow rate") $Q_{MS}$ of fuel, which is required for an ignition of the odd row of the main combustion portions 11, is supplied thereto in a stepwise manner.

Herein, since the step flow rate $Q_{MS}$ is overridden (added) to the fuel flow rate (reference fuel flow rate) Q indicated by the combustor power command FD, the step flow rate $Q_{MS}$ does not accord with the engine control. Thus, the step flow rate $Q_{MS}$ theoretically causes an inconsistency of the engine control.

However, actually, the fuel is filled in a pipe in a delayed manner, and an ignition of the combustor is delayed. Therefore, the main combustion portions 11 generates no power until the time $t_2$ when the main control portions 11 are ignited to start a combustion. Accordingly, no effect arises the engine control by this overriding.

For the same reason, when the operating combustion portions are switched without overriding the step flow rate $Q_{MS}$ to the fuel flow rate Q, that is, with merely maintaining the fuel flow rate Q to be constant (in the case of the above-described Japanese Patent Laid-Open Publication No. 206237/1987), a decrease of an engine power occurs because of an ignition delay of the main combustion portions 11.

That is to say, the combustor controller 6 starts a supply of fuel to the main combustion portions 11 in advance so as to prevent such a decrease of the engine power.

(3) At the time $t_2$ when the main combustion portions 11 are ignited to start a combustion, the overridden power of the main combustion portions 11 affects on the engine condition (turbine rotational speed N) ER. Then, an inconsistency of the engine control occurs.

Leaving this inconsistency as it is, the engine 1 is accelerated by the additionally added output of the main combustion portions 11, and the engine controller 4 detects the acceleration. The engine controller 4 then outputs the combustor power command FD indicating a decrease of the fuel flow rate Q in order that the accelerated state is returned to the steady state (original turbine rotational speed). In FIG. 2(a), the broken line L shows a behavior of the turbine rotational speed N when the inconsistent condition is left as it is. In this case, the engine controller 4 controls the fuel flow rate Q to settle the inconsistency (not shown).

(4) At the time $t_3$ when an ignition/combustion of the main combustion portions 11 is detected by a combustor ignition determination processing which is described below, the fuel flow rate command QD is immediately issued as explained below. The fuel flow rate command QD has a value obtained by subtracting the same amount as that of the step flow rate $Q_{MS}$ thrown into the main combustion portions 11 (in the process in the above-described step (2)) from a fuel flow rate at the detection of the ignition so that the step flow rate $Q_{MS}$ is subtracted from the pilot fuel flow rate $Q_P$. Thus, a variation of the engine condition caused by the inconsistency of the engine control can be restrained and an impact upon ignition of the main combustion portions 11 can be mitigated.

In this way, the fuel flow rate Q indicated by the combustor power command FD as a manipulated variable of the engine control corresponds to a sum of the actual pilot fuel flow rate $Q_P$ and the main fuel flow rate $Q_M$. Thus, the inconsistency of the engine control is settled, and the stage-processing of the odd row of the main combustion portions 11 is completed.

(5) Between the times $t_3$ and $t_4$, the time $t_4$ being a time when the stage-processing for the even row of the main combustion portions 11 is started, the engine control is carried out with respect to the sum power of a combustion power of the odd row of the main combustion portions 11 and a combustion power of the pilot combustion portions 12.

(6) At the time $t_4$, the step flow rate $Q_{MS}$ is supplied to the even row of the main combustion portions 11.

Thereafter, the same processes from the time $t_1$ to the time $t_4$ as for the odd row of the main combustion portions 11 and the pilot combustion portions 12, are carried out with respect to the even row of the main combustion portions 11 and the pilot combustion portions 12. Then, all the stage-processing is completed.

The combustor ignition determination processing is described below.

An ignition of the main combustion portions 11 can be detected by various means. When an ignition of the main combustion portions 11 is quickly detected, the time period when the inconsistency of the engine control exits, can be shortened, so that an impact to the engine can be mitigated. Thus, the ignition detecting means should quickly detect an ignition of the main combustion portions 11. In addition, if an ignition is quickly detected, the engine can be prevented from becoming unstable, which is caused by an abrupt combustion of an excessively supplied fuel because of a delay of the ignition detection.

A shortening of lifetime or a breakage of the combustor and the turbine because of an excess load of the combustor can also be prevented. Also for this reason, a quick ignition detection of the main combustion portions 11 is required.

From this point of view, the control system A according to the present invention determines an ignition of the main combustion portions 11 based on a pressure variation of the combustor B. A principle and process of the ignition determination based on a pressure variation of the combustor B is described below.

Figure 3:
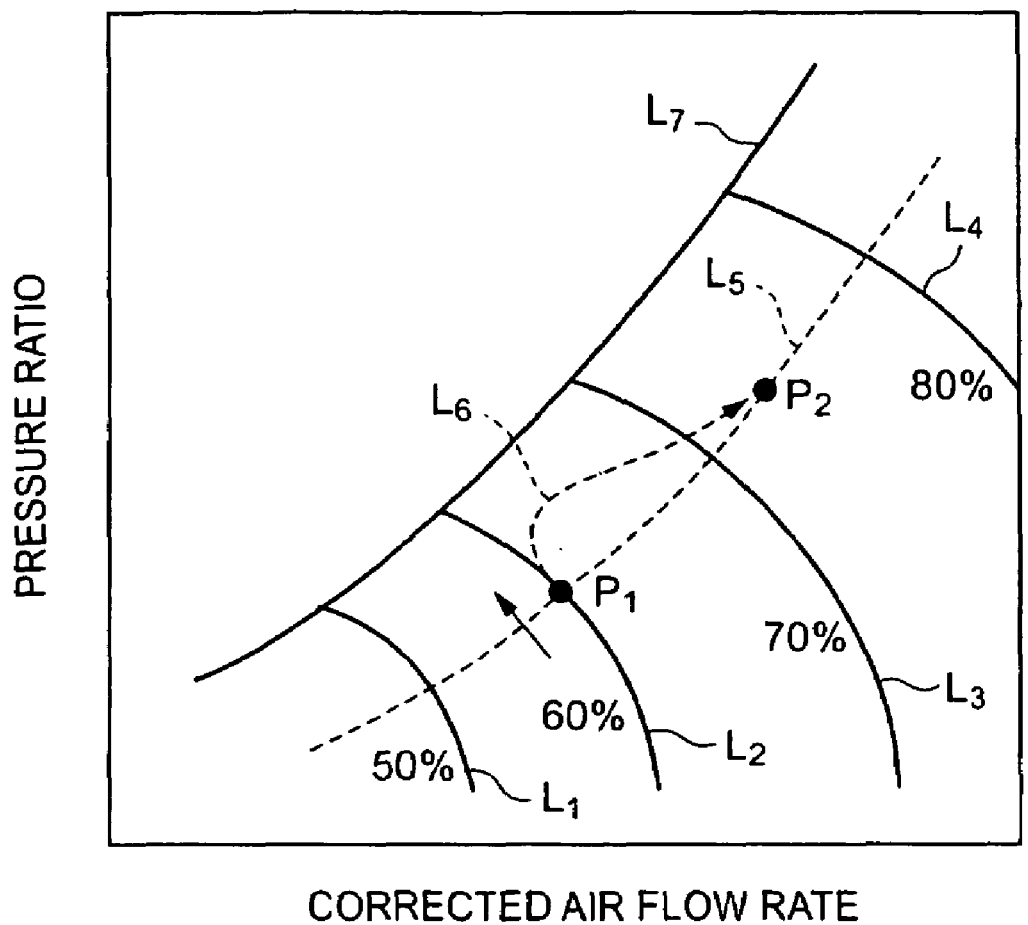
FIG. 3 is a graph showing a determination principle of an ignition determination processing.

The compressor C of the gas turbine engine 1 generally has pressure ratio—corrected air flow rate characteristics which are shown by the solid curved lines $L_1$, $L_2$, $L_3$, and $L_4$ in FIG. 3. The pressure ratio used herein means a value obtained by dividing a compressor outlet pressure by a compressor inlet pressure, that is, the value being compressor outlet pressure/compressor inlet pressure. In FIG. 3, the numerical values on percentage (50%, 60%, 70%, and 80%) represent corrected rotational speeds.

In a moderate acceleration and deceleration, the engine condition is changed along a quasi-static operation line $L_5$ shown by the broken line in FIG. 3. On the other hand, in a rapid acceleration, the engine condition is changed along a rapid acceleration operation line $L_6$ shown by the broken line with an arrow in FIG. 3. The curve shown by the solid line $L_7$ represents a limit line of a surge occurrence. That is, an upper side of the line L7 is a surge occurrence region.

Upon ignition of the main combustion portions 11 in the above-described stage-processing, a condition of the engine is the same as in a rapid acceleration. For example, when the main combustion portions 11 are ignited in a steady state (60% corrected rotational speed) shown by the point $P_1$, the engine condition is changed along the rapid acceleration operation line $L_6$ in a direction shown by the arrow in a quick response manner. In other words, immediately after the ignition, a pressure ratio is raised without any change of the rotational speed, while the corrected air flow rate is decreased.

That is, the rotational speed change is relatively slow in response because of an inertia of the turbine, while the pressure variation is relatively fast in response. Thus, the turbine rotational speed is raised after the temperature and the pressure are raised. In the case where a constant rotational speed of the engine is not controlled, the engine condition is directly changed to the condition shown by the point $P_2$.

Thus, attention is given to a change of the pressure ratio after the time when the step flow rate $Q_{MS}$ is supplied to the main combustion portions 11 in the above-described step (2). Namely, a change amount of the pressure ratio from the time $t_1$ in FIG. 2 is measured, and the thus measured change amount is compared with a predetermined ignition determination reference value. At the time when the change amount surpasses the ignition determination reference value, the ignition of the odd row of the main combustion portions 11 is determined. As for the even row of the main combustion portions 11, the same ignition determination process is conducted.

In this way, since the combustor controller 6 is capable of carrying out the ignition determination processing based on a pressure variation of the combustor, the ignition of the main combustion portions 11 can be quickly detected. As a result, the time period (the time period between the times $t_2$ and the $t_3$ in FIG. 2) when the inconsistency of the engine control exits during the stage-processing can be sufficiently shortened. In general, as compared with an engine control in which a turbine rotational speed which is relatively slow in response relative to a pressure variation is used as a controlled variable, an engine control in which a pressure sensor is used, can be properly and securely carried out. That is, the pressure sensor can detect an ignition of the main combustion portions 11 well before an adverse effect caused by the inconsistency of the engine control becomes noticeable. Therefore, the inconsistent condition can be securely settled. Further, since the duration of the inconsistent condition can be sufficiently shortened, when trying to maintain the engine condition shown by, for example, the point $P_1$ before or after the stage-processing, it is possible for a variation of the engine condition during the stage-processing to be significantly small.

As described above, in the gas turbine engine control system A of the embodiment according to the present invention, the engine controller 4 generates the combustor power command FD which operates the fuel flow rate Q (corresponding to a combustor power) such that the engine condition (turbine rotational speed N) complies with a target value. The combustor controller 6 controls the condition of the combustor B such that an actual combustor power corresponds to the combustor power command FD, and sets the fuel flow rates $Q_M$ and $Q_P$ to be supplied respectively to the combustion portions 11 and 12.

As mentioned above, a fuel flow rate command as a manipulated variable of a general engine control (mainly a rotational speed control) is interpreted as the combustor command FD, and the combustor controller 6 controls an amount of fuel to be supplied independently of the engine control when carrying out a stage-processing in the multistage combustor B including the main combustion portions 11 and the pilot combustion portions 12. Therefore, it is possible to carry out the stage-processing without interfering with the general engine control.

Accordingly, even a conventional system of the engine control can be directly applied to a multistage combustor basically without changing greatly the system, and a stage-processing can be smoothly conducted. As a result, a cost for development of the system can be reduced, and an optimum switching control can be carried out to minimize disadvantages accompanied with the staging-processing.

Specifically, immediately after an ignition of the main combustion portions 11 is confirmed by the ignition determination processing, the fuel flow rate command QD is issued so as to subtract the overridden step flow rate $Q_{MS}$ which has been applied to the combustor power command FD, from the pilot fuel flow rate $Q_P$. Thus, before the turbine rotational speed N is varied, the engine can be controlled to settle the inconsistency of the actual combustor power and the combustor power command FD. Accordingly, the engine is prevented from becoming unstable which results from an abrupt combustion of an overridden excess fuel during the stage-processing, so that a smooth stage-processing can be achieved.

Since an ignition of the main combustion portions 11 is quickly detected based on a pressure variation of the combustor, the engine is prevented from becoming unstable which results from an abrupt combustion of the excess fuel caused by an ignition delay. A shortening of lifetime or a breakage of the combustor and the turbine because of an excess load can also be prevented.

In addition, even when a minimum step flow rate required for an ignition of the main combustion portions 11 is relatively large in quantity, it is possible to switch the operating combustion portions with preventing an unstable condition (e.g., surge) of the engine. Thus, the combustor can be more freely designed.

The present invention is described referring to the embodiment. However, the present invention is not limited thereto and various changes and modifications are possible.

For example, in the control system A according to the embodiment, an ignition of the main combustion portions 11 is detected based on a pressure variation of the combustor when determining an ignition. However, an ignition may be detected based on a temperature change of the main combustion portions 11. That is, a temperature sensor can be disposed on the downstream of the main combustion portions 11 to detect an ignition thereof by comparing a change of the measured temperature from the stage-processing start time $T_1$ with a predetermined ignition determination reference value. This method is more reliable because a temperature of the main combustion portions 11 can be directly detected. In this case, how to attach a temperature sensor, a response delay of the sensor, and a durability thereof should be fully considered.

Alternatively, an ignition determination may be conducted based on a rotational speed variation of the engine or a variation of the fuel flow rate command FD. That is, the gas turbine engine 1 is generally controlled with a turbine rotational speed being constant. In a steady state of the engine, the turbine rotational speed and a manipulated variable (fuel flow rate command FD) of the engine control are constant. When carrying out a stage-processing, as described above, since a manipulated variable of the engine control is overridden and fuel is supplied to the main combustion portions 11, the rotational speed can be varied when the main combustion portions 11 are ignited. Thus, a manipulated variable of the engine control for controlling the rotational speed to be constant can also be varied. Therefore, it is possible to detect an ignition of the main combustion portions 11 by monitoring a variation of the rotational speed after the stage-processing starts. In this method, an ignition can be detected without disposing a special sensor for detecting an ignition. However, as describe above, since the rotational speed is slow in response, an ignition detection is likely to be delayed.

Further, an ignition of the main combustion portions 11 can be detected by measuring a brightness or an emission wavelength of the main combustion portions 11 by means of a fiber-optic sensor. Since detections of a brightness and an emission wavelength are responsive, a quick ignition determination of high precision can be anticipated. However, disadvantages, such as durability and maintenance of the sensor and a high cost, should be overcome.

In the above embodiment, the pilot combustion portions 12 and the main combustion portions 11 are disposed one-to-one relation. However, one pilot combustion portion 12 may disposed relative to a predetermined number of main combustion portions 11. For example, the pilot combustion portions 12 and the main combustion portions 11 may be disposed in one-to-three relation.

As described in detail, the present invention provides such an excellent effect in which a power variation of an engine can be restrained at the minimum when carrying out a stage-processing.

The invention claimed is:

1. A control method of a gas turbine engine including a combustor having a plurality of main combustion portions and a plurality of pilot combustion portions, an engine condition detector, and a combustor condition detector, comprising the steps of:
    outputting a combustor power command based on an engine condition from the engine condition detector; and
    carrying out a stage-processing by outputting a fuel flow rate command, the fuel flow rate of the command being obtained by overriding, for a predetermined period, a step flow rate determined based on a combustor condition from the combustor condition detector to a fuel flow rate determined based on the combustor power command.

2. The control method of a gas turbine engine according to claim 1, wherein
    the main combustion portions are divided into the predetermined number of blocks, and
    when the fuel flow rate command is output, the fuel flow rate command is respectively output to the main combustion portions of the combustor for every block.

3. The control method of a gas turbine engine according to claim 1, wherein
    immediately after an ignition of the main combustion portions is detected, the fuel flow rate of the command has a value obtained by subtracting the step flow rate from a fuel flow rate at the detection of the ignition.

4. The control method of a gas turbine engine according to claim 3, wherein
    the ignition of the main combustion portions is detected based on a pressure variation of the combustor, a temperature of a combustion gas, a brightness of a combustion gas, a wavelength of a combustion gas, a rotational speed of a turbine, or a controlled variable of the engine.

5. A controlling system of a gas turbine engine including a combustor having a plurality of main combustion portions and a plurality of pilot combustion portions, comprising:
    an engine condition detector;
    a combustor condition detector;
    an engine controller for outputting a combustor power command based on an engine condition from the engine condition detector; and
    a combustor controller for carrying out a stage-processing by outputting a fuel flow rate command, the fuel flow rate of the command being obtained by overriding, for a predetermined period, a step flow rate determined based on a combustor condition from the combustor condition detector to a fuel flow rate determined based on the combustor power command.

6. The controlling system of a gas turbine engine according to claim 5, wherein
    the combustor controller outputs the fuel flow rate command respectively to the main combustion portions divided into blocks.

7. The controlling system of a gas turbine engine according to claim 5, wherein
    immediately after an ignition of the main combustion portions is detected, the fuel flow rate of the command has a value obtained by subtracting a step flow rate from a fuel flow rate at the detection of the ignition.

8. The controlling system of a gas turbine engine according to claim 7, wherein
    the ignition of the main combustion portions is detected based on a pressure variation of the combustor, a temperature of a combustion gas, a brightness of a combustion gas, a wavelength of a combustion gas, a rotational speed of a turbine, or a controlled variable of the engine.

9. A gas turbine engine comprising:
    a compressor;
    a turbine;
    a combustor including a plurality of main combustion portions and a plurality of pilot combustion portions; and
    a control system of a gas turbine including an engine condition detector, a combustor condition detector, an engine controller for outputting a combustor power command based on an engine condition from the engine condition detector, and a combustor controller for carrying out a stage-processing by outputting a fuel flow rate command, the fuel flow rate of the command being obtained by overriding, for a predetermined period, a step flow rate determined based on a combustor condition from the combustor condition detector to a fuel flow rate determined based on the combustor power command.

* * * * *